United States Patent

Muellenberg

[11] Patent Number: 5,865,561
[45] Date of Patent: Feb. 2, 1999

[54] TENSIONING ASSEMBLY

[76] Inventor: Ralph Muellenberg, Im Wiesengrung 6, D-41516 Grevenbroich, Germany

[21] Appl. No.: 793,598
[22] PCT Filed: Jul. 12, 1995
[86] PCT No.: PCT/DE95/00912
 § 371 Date: Apr. 14, 1997
 § 102(e) Date: Apr. 14, 1997
[87] PCT Pub. No.: WO96/08661
 PCT Pub. Date: Mar. 21, 1996

[30] Foreign Application Priority Data

Sep. 13, 1994 [DE] Germany .......................... 94 14 881.3

[51] Int. Cl.⁶ ....................................................... F16D 1/06
[52] U.S. Cl. ........................... 403/370; 403/13; 403/374.4
[58] Field of Search ..................................... 403/370, 371, 403/374, 368, 367, 13, 14, 16

[56] References Cited

U.S. PATENT DOCUMENTS

| 3,722,644 | 3/1973 | Steinhagen | 192/56 |
| 3,760,916 | 9/1973 | Hanks et al. | 192/67 |
| 3,849,015 | 11/1974 | Peter et al. | 403/370 |
| 3,958,888 | 5/1976 | Mullenberg | 403/370 X |
| 4,025,213 | 5/1977 | Schafer et al. | 403/370 |
| 4,115,016 | 9/1978 | Muellenberg | 403/370 X |
| 4,781,486 | 11/1988 | Mochizuki | 403/370 X |
| 5,269,622 | 12/1993 | Mullenberg | 403/370 |

FOREIGN PATENT DOCUMENTS

| 2 025 761 | 9/1970 | France . | |
| 2302957 | 7/1974 | Germany | 403/374 |
| 23 29 940 | 1/1975 | Germany . | |
| 24 58 229 | 6/1976 | Germany . | |

Primary Examiner—Harry C. Kim
Attorney, Agent, or Firm—Foley & Lardner

[57] ABSTRACT

A tensioning assembly for connecting an outer component to a shaft. The tension assembly includes a double conical ring with a cylindrical circumferential surface and two oppositely inclined conical surfaces, and also includes two further conical clamping rings with each conical clamping ring having a conical circumferential surface which interacts with one of the conical surfaces of the double conical ring. Axial tensioning screws and axial forcing screws are uniformly distributed over the circumference of a pitch circle, such that the forcing screws are located at the same spacings and instead of the tensioning screws. At one location, a tensioning screw is provided outside the uniform spacings in order to ensure the correct alignment of the conical rings on the double conical ring in the circumferential direction.

4 Claims, 1 Drawing Sheet

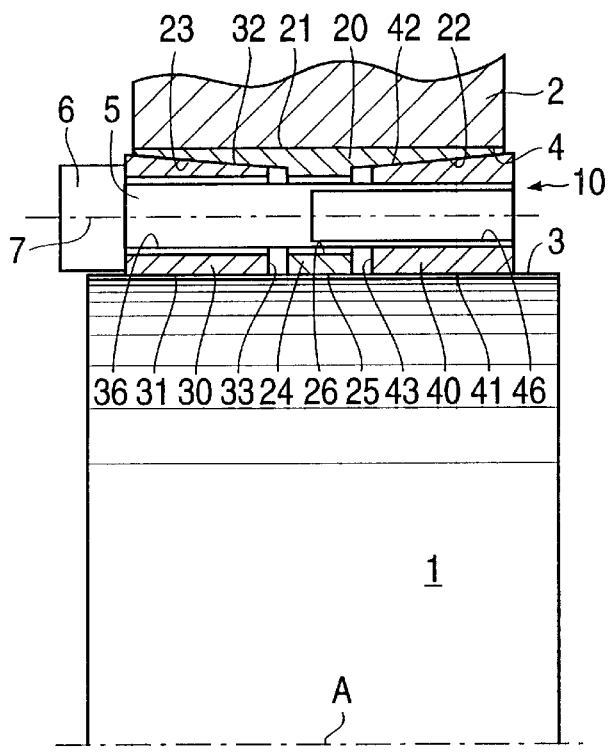
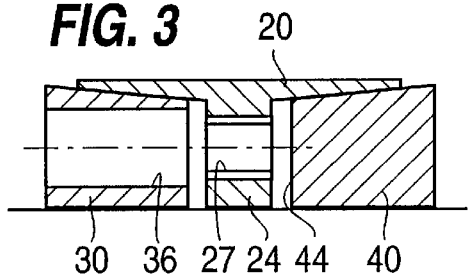
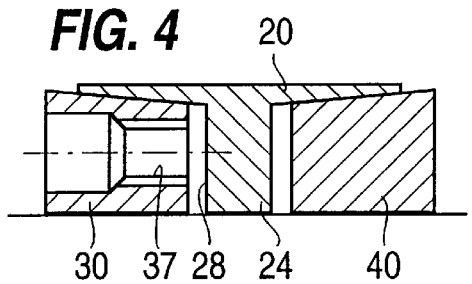
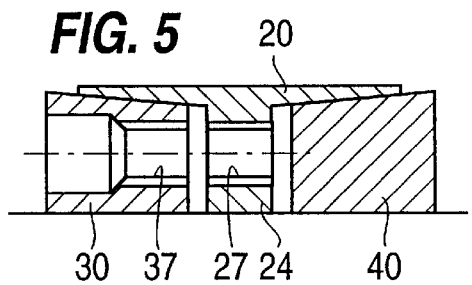
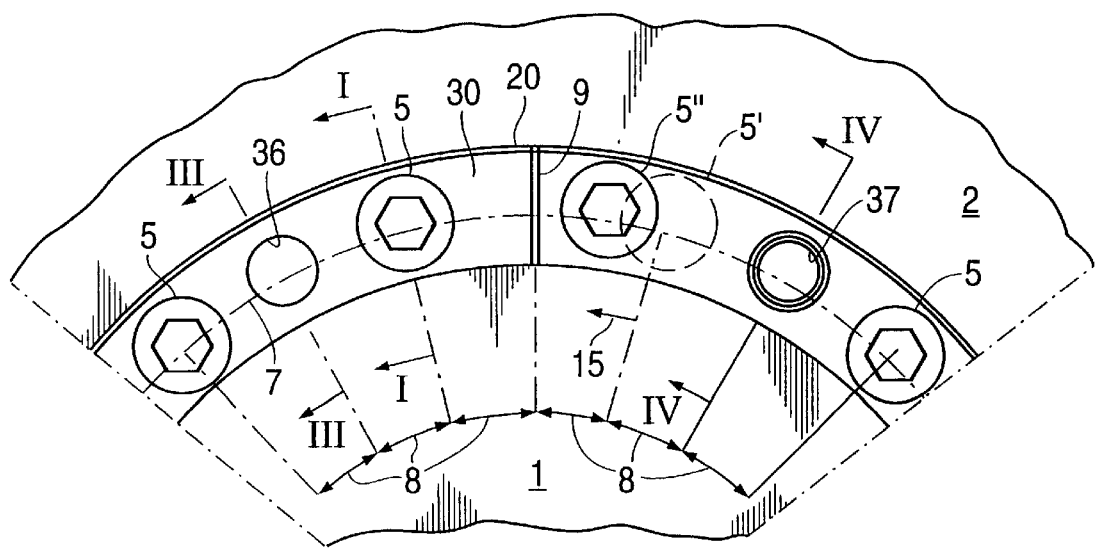

TENSIONING ASSEMBLY

BACKGROUND OF THE INVENTION

The invention relates to a tensioning assembly for connecting an outer component having a cylindrical aperture to an inner component having a cylindrical outer surface and arranged concentrically in the aperture.

A first tensioning assembly of this type is known from German patent 23 29 940 A 1. Each individual conical ring disclosed therein has a conical surface and a cylindrical circumferential surface, the cylindrical circumferential surface resting directly against the opposite circumferential surface of the hub or shaft. A tensioning assembly in accordance with German patent 24 58 229 A 1, discloses conical rings having two conical circumferential surfaces wherein each conical ring is assigned a further conical ring which has a conical surface and a circumferential surface. The conical rings which interact with the tensioning screws thus exert their radial force on the adjacent cylindrical circumferential surface of the shaft or of the hub via the further conical rings.

The common feature of the two embodiments is that the conical rings and the circumferential webs of the double conical rings have the bores for the tensioning screws and the forcing screws on a common pitch circle and at the same spacings. As a consequence, at some locations on the circumference bores for forcing screws are arranged in the positions in which tensioning screws would normally be located. This design considerably simplifies the production on a drilling unit with corresponding dividing apparatus.

The uniform spacings, while providing advantages in terms of production, nevertheless involve problems regarding the correct installation of the front conical ring, the front conical ring being directed toward the caps of the tensioning screws. The problem of misalignment can occur whether assembly takes place at the factory or on site, e.g. when fastening belt-drive drums for conveying belts in mining or the like. Incorrect installation can easily occur because it is not easy to see, from the front, whether the conical ring is in the correct angular position with respect to the double conical ring. When in the correct position, the various types of bores coincide precisely. In the event of careless installation, sometimes the threaded bores in the front conical ring, (the front conical ring being directed toward the caps of the tensioning screws), and the threaded bores for releasing the front conical ring from the double conical ring, are located opposite and in alignment with threaded bores in the circumferential web of the double conical ring which are provided for the release of the conical ring directed away from the caps of the tensioning screws. Since the numbers of forcing screws for releasing the front conical ring and the rear conical ring are equal and the forcing screws are distributed uniformly over the circumference, all the threaded bores in the front conical ring may be located opposite the threaded bores in the circumferential web. No indication of this misalignment is given by insertion of the tensioning screws.

After the relative positions of the rings have been set, the forcing screws are screwed into the threaded bores of the front conical ring and come into contact with the threaded bores in the circumferential web. As a result, it is more difficult to force off the front conical ring because there is no real abutment to effect the necessary leverage. In addition, the threaded bores in the circumferential web are destroyed such that, in some circumstances, it is no longer possible to force off the rear conical ring and consequently the entire conical tensioning assembly can no longer be released.

It may be a number of years before this situation arises, when release of the tensioning assembly is already made difficult enough by corrosion and dirt. Accordingly, when such a case does occur, the damage is considerable.

SUMMARY OF THE INVENTION

The object of the invention is to avoid incorrect angular positioning during installation of the conical rings of a tensioning assembly.

This object is achieved according to the invention by offsetting one tensioning screw bore in the circumferential direction. This simple offsetting measure ensures that one tensioning screw bore does not fit in with the spacings. Therefore, there is only one angular position of the front conical ring with respect to the double conical ring in which all the tensioning screws can be screwed in during installation. If a tensioning screw cannot be screwed in, this indicates that the angular positioning is incorrect. If a tensioning screw intended for coinciding with the uniform spacings is aligned with the offset through-bore in the circumferential web, none of the other screws is aligned with an aperture. In this manner, an obvious indicator provides a positive control for the correct positioning of the front conical ring with respect to the circumferential web.

DESCRIPTION OF THE DRAWINGS

An exemplary embodiment of the invention is illustrated in the drawings, in which:

FIG. 1 shows a side view of a conical tensioning arrangement, the tensioning assembly being reproduced in a longitudinal section, running through the axis, along line I—I in FIG. 2;

FIG. 2 shows a partial view according to FIG. 1 from the left;

FIGS. 3 to 5 show partial cross sections through the tensioning assembly along lines III—III and IV—IV in FIG. 2 and a corresponding partial cross section in the case of incorrect installation.

DESCRIPTION OF THE PREFERRED EMBODIMENTS

Shown in FIG. 1 and designated as a whole by 10 is a tensioning assembly for connecting a shaft 1, with an axis A, to an outer component 2 in the form of for example a gear wheel, a drive wheel, a belt-drive drum or a hub in general. The cylindrical outer circumference 3 of the shaft 1 has a smaller diameter than the cylindrical inner circumference 4 of the outer component 2. The tensioning assembly 10 is arranged in the interspace.

In the exemplary embodiment, the tensioning assembly 10 comprises a double conical ring 20 with a cylindrical outer circumferential surface 21 and two inner conical circumferential surfaces 22, 23 which are inclined in opposite directions to one another such that the largest wall thickness, as seen in the axial direction, is located in the center of the double conical ring 20. In the center, that is between the conical surfaces 22, 23, the double conical ring 20 has a circumferential web 24 projecting radially inward from the double conical ring 20. The circumferential web 24 rests, by means of its cylindrical inner circumferential surface 25, against the other circumferential surface 3 of the shaft 1, such that the circumferential web can assume centering tasks.

The double conical ring 20 is assigned two individual conical rings 30 and 40, each of which, in the exemplary embodiment, has a cylindrical inner circumferential surface 31 and 41, respectively, and a conical outer circumferential surface 32 and 42, respectively. The conical outer circumferential surfaces 32 and 42 interact with the conical inner circumferential surfaces 22 and 23. The conical surfaces 22, 42 and 23, 43 have cone angles in the self-locking region and rest against one another, while the inner end sides 33, 43 of the conical rings 30, 40 are still at an axial distance from the circumferential web 24.

The tensioning assembly 10 is braced by means of axial tensioning screws 5 having caps 6. The axial tensioning screws are distributed uniformly around the circumference corresponding to appropriate apertures. According to FIG. 1, the axial tensioning screws are threaded through throughbores 36 in the front conical ring 30 and through-bores 26 in the circumferential web 24 and engage threaded bores 46 in the rear conical ring 40 (the rear conical ring being directed away from the caps 6).

The circumferential web 24 projects radially inward from the conical surfaces 22, 23. The double conical ring 20 is rather thin-walled in comparison to the radial extent of the circumferential web 24. In the exemplary embodiment, the radial extent of the circumferential web 24 is approximately three times the largest wall thickness in the region of the conical surfaces 22, 23. The region of the radial projections of the circumferential web 24 is taken up by the conical rings 30, 40 and the tensioning screws 5 also run into this region. The conical rings 30, 40 are thus relatively thick-walled in the radial direction such that the bores for the tensioning screws 5 and, in particular, the caps 6 thereof can be accommodated in the radial extent of said conical rings 30, 40. As a result of their thick walls, the conical rings 30, 40 are fairly stable and, without any special measures being provided, resist deformation such that the deformation of the conical rings requires a very high proportion of the tensioning force of the screws 5. This deformation force does not contribute to the clamping force. In order to reduce the resistance to deformation and to consequently increase the proportion of the tensioning force of the screws 5 contributing to the clamping action, the conical rings are provided, in the exemplary embodiment, with a slit 9 through the conical rings in a plane passing through the axis.

When the tensioning screws 5 are tightened, the conical rings 30, 40 are drawn axially against one another. The conical surfaces 32, 42 of the conical rings 30, 40 slide on the conical surfaces 23, 22 and widen the double conical ring 20 radially such that the outer component 2 is clamped on the shaft 1.

Since the conical surfaces 22, 42 and 23, 32 are located in the self-locking region, the axial tensioning force of the tensioning screws 5 is converted into radial clamping force with relatively high efficiency. However, because the assembly is self-locking, once tightened, the tensioning assembly cannot be released again of its own accord; rather, special measures are required for release purposes. The release measures are explained with reference to FIGS. 2 to 5.

Substantially all the tensioning screws 5 are located on a common pitch circle 7 at uniform spacings. The uniform spacing is indicated in FIG. 2 by the angle 8 between each two adjacent bore locations in the circumferential direction. At some locations, e.g. three uniformly distributed locations, there are no tensioning screws 5 at the relevant spacing positions; rather, prepared configurations for forcing screws are provided.

Such a forcing screw configuration is shown in FIG. 3. At this location, the conical ring 30 has a through-bore 36, the circumferential web 24 has a threaded bore 27, and the conical ring 40 has a bore-free location 44. According to FIG. 3, it is possible to screw in a screw, e.g. an unscrewed tensioning screw 5, at this location and to force off the conical ring 40 away from the double conical ring 20.

Another forcing-off arrangement, which is situated at another circumferential location, is represented in FIG. 4. In this case, the conical ring 30 has a threaded bore 37 and the circumferential web 24 has a bore-free location 28. The configuration of the other conical ring 40 at this location is immaterial. By screwing a screw 5 into the threaded bore 37, the conical ring 30 is forced away, according to FIG. 4, from the double conical ring 20.

In this manner, the two conical rings 30, 40 can be reliably released from the double conical ring 20 independently of one another.

During the installation of the tensioning assembly 10, it is difficult to see, from the front, the type of configuration of the circumferential web 24 behind the respective bore of the conical ring 30. In unfavorable situations, e.g., those situations not in accordance with the present invention, the conical ring 30 might be assembled with the double conical ring 20 in such an angular position that the threaded bores 37 and 27 come to coincide with one another as shown in FIG. 5. In this case, the tensioning screws 5 can be readily screwed in and tightened. Bracing with incorrect relative positioning of the conical ring 30 and the double conical ring 20 can thus take place unnoticed. If, then, after some time has passed, a screw 5 is screwed into the threaded bore 37 from the front for release purposes, it comes into contact with the threaded bore 27, and, under the necessary large forces, the screw will work its way into the thread of the threaded bore 27 to some extent. Even if it is still possible to draw off the conical ring 30 away from the double conical ring 20, the thread of the threaded bore 27 is still ruined such that it is no longer possible to screw a screw into the threaded bore 27 in order to release the conical ring 40.

In order to prevent this situation and in accordance with this invention, a tensioning screw 5" with the associated bores is, at one location, offset in the circumferential direction, by a small angle 15 from the normal spacings. Therefore where the tensioning screw would have taken up the position 5' indicated by dashed lines in FIG. 2 it now, instead, is positioned at 5". There is then only a single relative angular position of the conical ring 30, in the circumferential direction, with respect to the double conical ring 20, in which all the tensioning screws 5 can be screwed in. This position is, of course, selected so as to provide the forcing-off configurations according to FIGS. 3 and 4, and not according to FIG. 5. It is then impermissible for the situation of FIG. 5 to arise. If a tensioning screw 5 or all the tensioning screws 5 but one cannot be screwed in, then this is a definitive indication that the angular positioning of the conical ring 30 is incorrect. In the exemplary embodiment, the offset tensioning screw 5" is located beside the slit 9. In this manner, it is easy to find the location situated outside the spacings.

I claim:

1. A tensioning assembly for connecting an outer component to an inner component comprising:

(a) a double conical ring having concentric first and second peripheral surfaces, the first surface being cylindrical and adapted for engagement with a surface of one of the two components, the second surface having two oppositely inclined conical surfaces arranged such that the double conical ring has a maximum wall thickness in its midportion;

(b) first and second conical clamping rings, each conical clamping ring having a conical circumferential surface for engaging one of the two conical surfaces of the second surface of the double conical ring, each conical clamping ring further having a cylindrical surface adapted for engagement with a surface of the other of the two components;

(c) a circumferential web projecting radially from the second surface of the double conical ring, wherein the circumferential web extends between the first and second conical clamping rings;

(d) axial tensioning screws for axially advancing the first and second conical rings toward the circumferential web, each axial tensioning screw having a cap end;

(e) axial forcing screws for axially separating the first and second conical rings from the circumferential web;

(f) aperture sites located at uniform intervals around the first and second conical rings and the circumferential web; and (g) an offset aperture for aligning the first and second conical rings and the circumferential web, wherein the offset aperture is located along the circumference of the rings and web at a location other than the aperture sites;

wherein the forcing and tensioning screws are distributed such that some tensioning screws are provided at some aperture sites where the first conical ring has a through-bore, the circumferential web has a through-bore and the second conical ring has a threaded-bore, such that some forcing screws are provided at some aperture sites where the first conical ring has a through-bore, the circumferential web has a threaded-bore and the second conical ring has no bore, and such that other forcing screws are further provided at some aperture sites where the first conical ring has a threaded-bore and the circumferential web has no bore;

wherein one tensioning screw is provided at the offset aperture where the first conical ring has a through-bore, the circumferential web has a through-bore, and the second conical ring has a threaded-bore; and wherein only one relative position among the first and second conical rings and the circumferential web provides this alignment among the aperture sites and the offset aperture of the conical rings and the circumferential web.

2. The tensioning assembly of claim 1 wherein the first and second conical rings comprise a plurality of rings.

3. The tensioning assembly of claim 1 wherein each of the first and second conical rings has a slit for decreasing resistance to deformation.

4. The tensioning assembly of claim 1 wherein the aperture sites are located on a common radius circle around the circumference of the conical rings and circumferential web.

* * * * *